United States Patent
Foster

[15] 3,653,360
[45] Apr. 4, 1972

[54] ANIMAL FEEDER AND TIMING MECHANISM THEREFOR

[72] Inventor: William C. Foster, 603 Bay Drive, Baltimore, Md. 21220

[22] Filed: Jan. 19, 1970

[21] Appl. No.: 4,010

[52] U.S. Cl.....................119/51.12, 58/1, 119/51.11, 119/51.14
[51] Int. Cl. ......................................................A01k 5/02
[58] Field of Search............119/51, 29, 51.11, 51.12, 51.13, 119/51.15, 51.5; 62/140; 58/1; 116/118

[56] References Cited

UNITED STATES PATENTS

| | | | |
|---|---|---|---|
| 3,491,723 | 1/1970 | Soukeras | 119/51.12 |
| 3,374,643 | 3/1968 | Thorner | 62/140 |
| 3,232,274 | 2/1966 | Chatfield | 119/51.12 |
| 3,330,256 | 7/1967 | De Vaux | 119/51.12 |
| 3,399,541 | 9/1968 | Thorner | 62/140 |

Primary Examiner—Aldrich F. Medbery
Attorney—Colton & Stone

[57] ABSTRACT

The disclosure is directed to an inexpensive feeder which will deny animal access to the contents thereof for a predetermined time interval as controlled by a timer employing ice as a meltable timer element.

1 Claim, 6 Drawing Figures

PATENTED APR 4 1972
3,653,360
SHEET 1 OF 2
FIG. 1
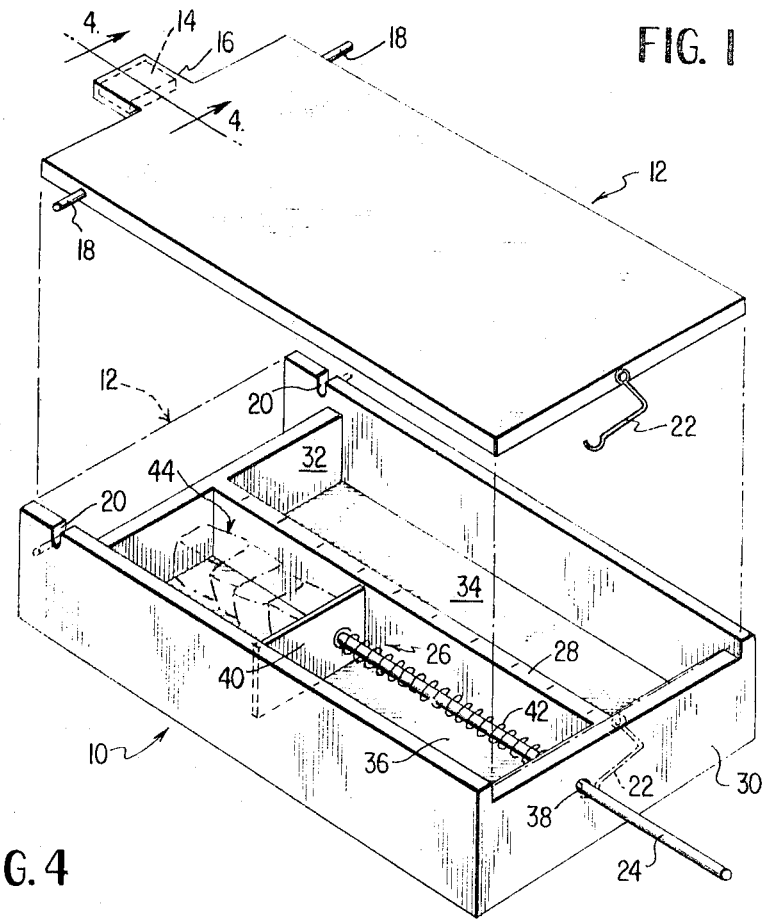
FIG. 4
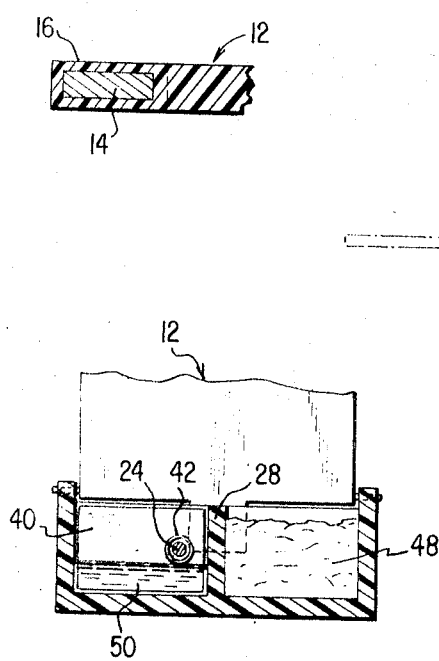
FIG. 3
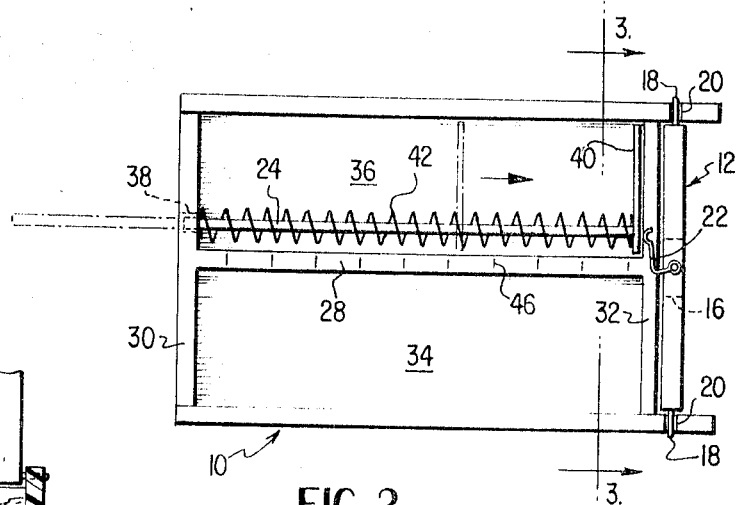
FIG. 2
INVENTOR
WILLIAM C. FOSTER
BY Colton + Stone
ATTORNEYS.

PATENTED APR 4 1972 3,653,360

INVENTOR
WILLIAM C. FOSTER

BY Colton + Stone

ATTORNEYS.

2

ANIMAL FEEDER AND TIMING MECHANISM THEREFOR

BACKGROUND OF THE INVENTION

It is generally recognized that animal food intake should be regulated both as to quantity and time of feeding to avoid food wastage and overconsumption with its concomitant health hazard. In those instances where it is undesirable or impractical to make animal food available within desirable time intervals such as, for example, in the case of household pets where the owners may be absent during the working day; the usual practice has been to make a sufficient quantity of food available to sustain the animal throughout the day. Inasmuch as animals have a tendency to immediately consume available food an owner is aware that if the food is limited to a specified amount appropriate to the extended time interval between feedings, the animal will immediately consume the same and its appetite will be unsatisfied at a later time prior to the next feeding. Conversely, if an overabundance of food is made available the animal will not only overeat but will frequently waste the excess food.

The economic considerations regarding overindulgence and/or food wastage may be very substantial in commercial operations whereas health and well-being are the primary concerns of household pet owners. These problems have been dealt with at both the commercial and household levels by the use of automated feeders which may be prestocked with an appropriate quantity of food to which the animal is denied access until a predetermined feeding time. Although feeders of this type serve their intended function in a satisfactory manner they have not achieved wide scale acceptance, particularly at the household level, because of their relative complexity and substantial cost. Typically, automatic feeders of the type previously suggested, as in U.S. Pat. Nos. 2,752,995 and 3,330,256, employ conventional timing mechanisms to make animal food available at a predetermined time. While the gross bulk and expense of such timing mechanisms may be acceptable to commercial animal raisers it is substantially less attractive to the owner of a household pet where the bulk of the timing mechanisms alone, quite apart from its obvious expense, is a substantial deterrent to wide-spread commercial acceptance.

SUMMARY OF THE INVENTION

The primary purpose of the invention is to provide an automated animal feeder, particularly for household pets, whose bulk and expense is substantially the same as that of a combined feeding and watering receptacle.

Further objects of the invention are to provide a feed container which may be stocked with an appropriate quantity of food for a single feeding which quantity of food is made available for animal consumption only after a predetermined time interval under the control of a meltable timer element; to provide limited refrigeration for the food and to provide drinking water as an incident of the melting timing element; and to introduce a novel timing device, per se.

In addition to the introduction of a novel timing device, per se; the foregoing objects are achieved by the provision of a latch assembly comprising relatively movable latching elements coacting between an animal feed receptacle and its latchable closure to unlatch the closure after a predetermined degree of relative movement which degree of movement may be pre-established, and the time required therefor preset by conditioning the movement of one such element on the melting time for a given quantity of ice. More specifically, a latch element carried by the receptacle is biased for movement in an unlatching direction against a quantity of ice and may move in that direction as the ice melts to release the latch assembly.

DESCRIPTION OF THE DRAWINGS

FIG. 1 illustrates, in solid lines, an exploded perspective of an animal feeder constructed in accordance with the present invention;

FIG. 2 is a top plan view of an assembled animal feeder as shown in FIG. 1 with the closure member in the open position;

FIG. 3 is a broken sectional view taken along the line 3—3 of FIG. 2 and illustrating food and water in the proper containers;

FIG. 4 is a broken sectional view taken along the line 4—4 of FIG. 1;

DESCRIPTION OF THE PREFERRED EMBODIMENTS

Figure 5:
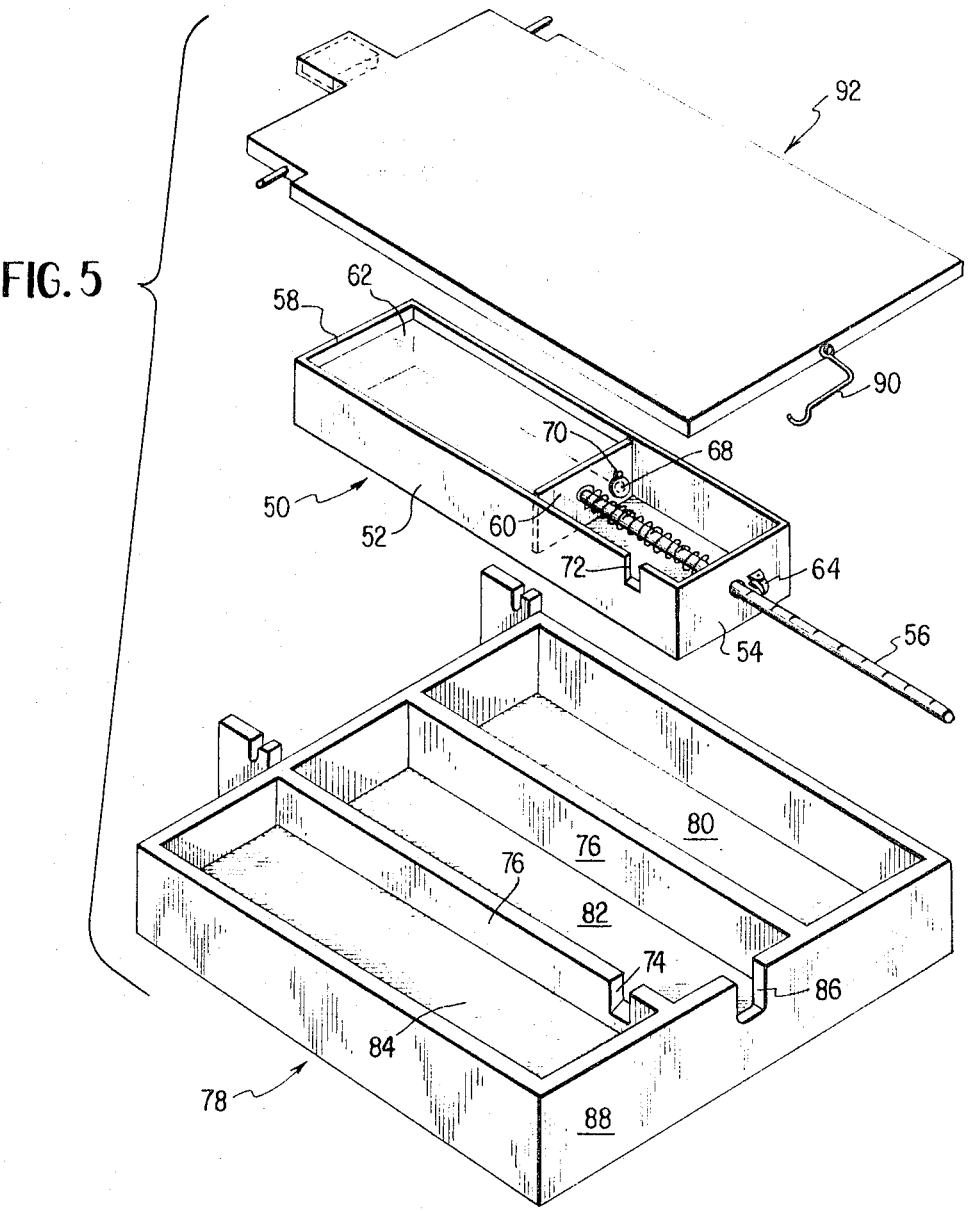
FIG. 5 is an exploded perspective of a second embodiment of the invention illustrating the novel timer as a separable component.

FIG. 1 portrays, in solid lines, an exploded perspective of an animal feeder in accordance with a first embodiment of the invention which includes a receptacle 10 having a pivotal closure 12 normally biased toward the open position of FIG. 2 by a suitable weight 14 embedded in a tail-like protuberance 16 extending to one side of the closure pivot axis defined by pivots 18 adapted to be received in receptacle pivot slots 20. The end of closure member 12 remote from weight 14 mounts a pivotal hook element 22 which coacts with rod 24 of timer mechanism 26 to provide a latch assembly to maintain the closure member in the closed dotted line position of FIG. 1 against the bias of weight 14.

The receptacle and closure members are desirably formed from a lightweight insulating material such as polystyrene or the like into which weight 14 and pivots 18 may be molded in situ, for example.

Receptacle 10 includes an imperforate central partition 28 extending between front and rear walls 30, 32 to define a feed compartment 34 and a combined timing and watering compartment 36. Front wall 30 is formed with an opening 38 above the normal water level in compartment 36 through which one end of rod 24 extends for latching coaction with closure hook 22.

The timing mechanism includes an abutment element 40 secured to one end of rod 24 and biased in the direction of rear wall 32 by compression spring 42 reacting between front wall 30 and the abutment element. An ice mass 44, illustrated as four ice cubes in FIG. 1, positioned intermediate rear wall 32 and abutment element 40 serves as a meltable timing element to constrain the spring biased movement of the abutment element and rod 24 toward the latch releasing position shown in solid lines in FIG. 2. Abutment element 40 is undersize with respect to compartment 36 to permit the seepage of water from the melting ice to the other side of the abutment element.

As will be apparent from a comparative inspection of the closed dotted line closure position in FIG. 1 with the open solid line position in FIG. 2; rod 24 coacts with hook 22 to maintain the closure in the closed position at all positions thereof except when the abutment member is against rear wall 32 and the other end of rod 24 is within opening 38. The length of time required for rod 24 to move from the latching or dotted line position of FIG. 2 to the unlatched or solid line position of FIG. 2 will be a function of the quantity of ice 44, the ambient temperature and the insulating qualities of the feeder construction. Center partition 28 may be provided with indicia 46 representing approximate hour intervals for a given feeder construction assuming a given household temperature and the use of standard size ice cubes. As will be apparent from the subject matter of the invention, precise timing is not required. It is only important that the timer approximate a desired feeding time. Thus, in the case of household pets, an appropriate feeding time could well span several hours during the mid-day period although a fairly precise timing interval can be determined by visual inspection, if desired.

In the case of a lightweight moldable construction, such as styrofoam, the use of weight 14 is preferred to provide the closure opening bias though it is apparent that a tension spring interconnected between predetermined 16 and the receptacle body could be utilized in like manner.

In use, a quantity of animal food 48 sufficient for a single feeding is placed in compartment 34, a desired quantity of ice is placed in compartment 36 between the abutment and end wall 32, and the closure secured in the dotted line position of FIG. 1 by the engagement of hook 22 with the projecting end of rod 24. After approximately 4 hours, the ice 44 will have melted permitting compression spring 42 to move abutment 40 against end wall 32 and retract rod 24 from latching engagement with hook 22. Weight 14 then pivots closure 12 to the open position of FIG. 2 permitting animal access to the contents of the receptacle. In addition to serving as a timing element, ice 44 further functions to provide a degree of refrigeration for the food and the water 50 accumulated in compartment 36 from the melted ice serves as the drinking water. This latter feature has the advantage that it is unnecessary to handle a pan of water with its consequent likelihood of spillage. The offset relationship of rod 24 relative to the centerline of compartment 36 is to leave sufficient room for the animal to drink.

An animal may be made aware of the opening time of the feeder by the use of a bell or other sounding device attached to the closure member, as desired, to induce a Pavlovian response in the animal.

Figure 6:
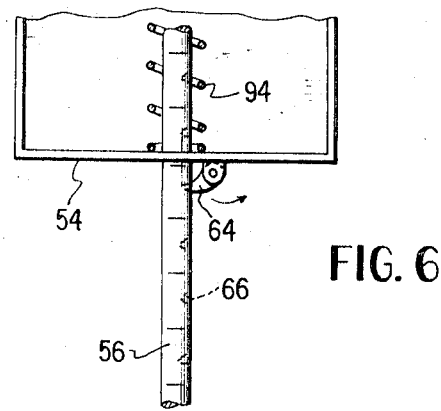
FIG. 6 is a broken detail view of a portion of the timer.

The feeder construction shown in FIGS. 5 and 6 differs from that previously described in that a removable and somewhat modified timer mechanism is employed and a supply of drinking water is available at all times.

The timer mechanism 50 is generally in the form of a rectangular tray 52 having an apertured front wall 54 for the passage of rod 56 and an imperforate rear wall 58 which coacts with abutment 60 to maintain a body of ice 62 therebetween. A pawl 64 pivotally mounted on front wall 54 may be used to selectively lock rod 56 in any desired position as by engagement with notches 66. Abutment 60 has a stealing fit with the side and bottom walls of tray 52 and water may be selectively retained between end wall 58 and abutment 60 or permitted to drain through the abutment member by closing or opening a drain aperture in abutment 60 controlled by a face valve 68 having a tight friction fit with its pivot 70 and the front surface of the abutment. A slot 72 in one wall of tray 52 aligns with a corresponding slot 74 in one of two partitions 76 dividing receptacle 78 into feed, timing and watering compartments 80, 82, 84. Slots 72 and 74, collectively, form a weir between the timing and watering compartments. A slot 86 in the front wall 88 of receptacle 78 is provided for rod 56 whereby the same may coact with hook 90 on closure 92 in the same manner as described in connection with FIGS. 1–4. It will be noted that closure member 92 does not overlie the watering compartment 84 which provides an open drinking receptacle at all times. The drinking water is, of course, supplemented by water from the melting ice as it overflows the weir.

Although valve 68 may be moved to the open position and pre-frozen ice such as ice cubes, crushed ice or the like utilized as the meltable timing element; the meltable timing element of the FIG. 5 embodiment is particularly adaptable to be frozen in situ. Thus, rod 56 may be withdrawn against the bias of spring 94 to a desired timing interval and latched by pawl 64. Thereafter, with valve 68 closed, the water-tight compartment defined by end wall 58, the side walls of tray 52 and the abutment 60 may be filled with water to a desired depth and placed in a freezer. After the water is frozen to form ice 62, valve 68 is opened, pawl 64 is released and the closure member latched in the closed position. As ice block 62 melts, water flows through the opening in the abutment member and, ultimately, into drinking compartment 84. After ice block 62 melts, rod 56 is moved inwardly to unlatch the closure in the manner previously described.

I claim:

1. An animal feeder, comprising; a feed container including separate feed and timing compartments, a closure member mounted for movement into and out of overlying relationship to said compartments, a latch element carried by said closure, a coacting latch element carried by said container for movement of one end thereof between a first latching position extending outwardly of one end wall of said container and a second unlatching position within the confines of said container, an ice abutment member within said timing compartment and adapted to engage a body of ice, said coacting latch element being secured to said abutment member, and means biasing said abutment member and coacting latch element toward the ice engaging and unlatching positions.

* * * * *

UNITED STATES PATENT OFFICE
CERTIFICATE OF CORRECTION

Patent No. 3,653,360          Dated April 4, 1972

Inventor(s) William C. Foster

It is certified that error appears in the above-identified patent and that said Letters Patent are hereby corrected as shown below:

Column 1    Line 41    "Mechanisms" should be "mechanism";

Column 2    Line 74    "predetermined" should be "protuberance";

Column 3    Line 35    "stealing" should be "sealing";

Signed and sealed this 1st day of August 1972.

(SEAL)
Attest:

EDWARD M. FLETCHER, JR.        ROBERT GOTTSCHALK
Attesting Officer                 Commissioner of Patents